(12) United States Patent
Naito et al.

(10) Patent No.: US 8,022,125 B2
(45) Date of Patent: Sep. 20, 2011

(54) PRESSURE-SENSITIVE ADHESIVE SHEET

(75) Inventors: Tomonari Naito, Ibaraki (JP); Michio Umeda, Ibaraki (JP); Akiko Takahashi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1350 days.

(21) Appl. No.: 11/289,562

(22) Filed: Nov. 30, 2005

(65) Prior Publication Data

US 2006/0116455 A1 Jun. 1, 2006

(30) Foreign Application Priority Data

Nov. 30, 2004 (JP) .............................. P. 2004-345286

(51) Int. Cl.
*C08K 5/16* (2006.01)
(52) U.S. Cl. .................... 524/187; 428/424.4; 428/461; 428/476.3; 428/483; 428/518
(58) Field of Classification Search .................. 524/187; 428/424.4, 461, 476.3, 483, 518
See application file for complete search history.

(56) References Cited

U.S. PATENT DOCUMENTS

| 5,695,837 A * | 12/1997 | Everaerts et al. ............ 428/40.1 |
| 6,048,467 A | 4/2000 | Dahmen et al. |
| 2003/0023018 A1 | 1/2003 | Nakano et al. |
| 2005/0118413 A1 | 6/2005 | Kamine et al. |

FOREIGN PATENT DOCUMENTS

| CA | 2 138 154 C | 12/2000 |
| EP | 0498634 A2 | 9/1992 |
| EP | 0 937 761 A1 | 8/1999 |
| EP | 0 997 514 A1 | 5/2000 |
| EP | 1 498 462 A1 | 1/2005 |
| JP | 61-209283 A | 9/1986 |
| JP | 04-088076 A | 3/1992 |
| JP | 05-311137 A | 11/1993 |
| JP | 07-102151 A | 4/1995 |
| JP | 7-507556 T | 8/1995 |
| JP | 07-268176 A | 10/1995 |
| JP | 10-036578 A | 2/1998 |
| JP | 10-120854 A | 5/1998 |
| JP | 10-237764 A | 9/1998 |
| JP | 11-028789 A | 2/1999 |
| JP | 11-315260 A | 11/1999 |
| JP | 2002-146312 A | 5/2002 |
| JP | 2002-285137 A | 10/2002 |
| JP | 2003-206458 A | 7/2003 |
| JP | 2003-327938 A | 11/2003 |
| JP | 2003-336021 A | 11/2003 |
| JP | 2004-231817 A | 8/2004 |
| JP | 2004-231819 A | 8/2004 |
| JP | 2004-315767 A | 11/2004 |
| JP | 2005-502458 A | 1/2005 |
| JP | 2005-146113 A | 6/2005 |
| WO | WO 96/33246 A1 | 10/1996 |

OTHER PUBLICATIONS

European Search Report dated Mar. 9, 2006.
Japanese Office Action issued in Application No. 2004-345286, dated Apr. 20, 2010.
Karl-Friedrich Arndt: "4 Molmasse und Molmassenbestimmung", dated Jan. 1, 1996, Polymercharakterisierung, Carl Hanser, Verlag, Munchen Wien, pp. 92-107, XP002583664, ISBN: 978-3-446-17588-4.
European Office Action, Application No. 05026008.2, dated Jul. 22, 2010.
Taiwanese Office Action, dated Nov. 16, 2010, issued in Application No. 094141257.
"Kao's high class leather plasticizer" Kao Corporation.
Adhesive Handbook, 1st edition, Japan Adhesive Tape Manufacturers Association.
Adhesive Handbook, 2nd edition, Japan Adhesive Tape Manufacturers Association.
Notice from Japanese Patent Office dated Sep. 10, 2007.
Submission of Publications in corresponding JP 2004-345286 dated Aug. 9, 2007.
Japanese Office Action, dated Jul. 5, 2011, issued in Application No. 2004-345286.

* cited by examiner

*Primary Examiner* — Edward J Cain
(74) *Attorney, Agent, or Firm* — Sughrue Mion, PLLC

(57) ABSTRACT

A pressure-sensitive adhesive sheet contains at least a pressure-sensitive adhesive layer containing an acrylic pressure-sensitive adhesive containing an acrylic polymer composition containing an acrylic polymer as a main component and a tackifier containing a tackifying resin as a main component, wherein reflection rate and attached amount in the fogging test in accordance with German Industrial Standard DIN 75201 are 70% or more and 2.0 mg or less, respectively. In the acrylic pressure-sensitive adhesive which forms the pressure-sensitive adhesive layer, a ratio of components having a molecular weight of 300 or less is preferably 4.2% by weight or less based on the total amount of solid matter of the acrylic pressure-sensitive adhesive. Furthermore, in the tackifying resin in the tackifier, a ratio of components having a molecular weight of 300 or less is suitably 4.2% by weight or less based on the total amount of solid matter of the tackifying resin.

6 Claims, 1 Drawing Sheet

PRESSURE-SENSITIVE ADHESIVE SHEET

FIELD OF THE INVENTION

The present invention relates to a pressure-sensitive adhesive sheet. More specifically, it relates to a pressure-sensitive adhesive sheet (pressure-sensitive adhesive tape, pressure-sensitive adhesive sheet, pressure-sensitive adhesive film, or the like) having a high adhesiveness and exhibiting a reduced occurrence of a fogging phenomenon.

BACKGROUND OF THE INVENTION

Acrylic pressure-sensitive adhesives are excellent in properties such as weather resistance and are widely utilized as pressure-sensitive adhesives forming pressure-sensitive adhesive layers in various pressure-sensitive adhesive sheets. Among the acrylic pressure-sensitive adhesives, since a water-dispersion type acrylic pressure-sensitive adhesive using a water-dispersion type acrylic polymer does not use any organic solvent as a solvent unlike a solvent-type acrylic pressure-sensitive adhesive, the water-dispersion type acrylic pressure-sensitive adhesive has advantages that it is desirable in view of environmental health and also is excellent in view of solvent resistance. In general, in the case that the acrylic pressure-sensitive adhesive is constituted by an acrylic polymer alone, it is difficult to obtain sufficient pressure-sensitive adhesive properties such as a high adhesiveness and hence a tackifying resin is added thereto in order to impart such properties. However, when the pressure-sensitive adhesive tape manufactured with adding a tackifying resin is used at fixing automobile parts such as interior materials for automobiles for a long period of time, there arises a problem that there is observed a so-called "fogging phenomenon" wherein volatile components in the pressure-sensitive adhesive tape attach to windshield and the like to cause fogging.

On the other hand, though it is a case different from the cases of pressure-sensitive adhesives or pressure-sensitive adhesive tapes, a method for reducing the occurrence of the fogging phenomenon has been proposed in "adhesives" used for adhesion of interior materials for automobiles [cf. JP-A-2003-327938 (the term "JP-A" as used herein means an "unexamined published Japanese patent application")]. Specifically, in an adhesive comprising a styrene-based block copolymer as a main agent, there has been proposed a method for reducing the occurrence of the fogging phenomenon by regulating a ratio of components having a molecular weight of 400 or less in the total composition constituting the adhesive to less than 7% by weight.

However, such a method for reducing the occurrence of the fogging phenomenon is relevant to a hot-melt adhesive. Therefore, it is necessary to melt the adhesive by heating or the like at adhesion operation and thus a step for-melting the adhesive, such as heating, is required. Recently, in the assembly line of automobiles, it is increasingly required to shorten operating time and hence pressure-sensitive adhesive tapes with which the adhesion operation can be performed without requiring a means of heating or the like have been increasing employed. However, as mentioned above, in the case that conventional pressure-sensitive adhesive tapes are used for adhesion of interior materials for automobiles, the generation of the fogging phenomenon is regarded to be problematic. In particular, as the amount of the pressure-sensitive adhesive tapes used per one automobile increases, a pressure-sensitive adhesive tape exhibiting a reduced occurrence of the fogging phenomenon has been desired.

SUMMARY OF THE INVENTION

Accordingly, an object of the invention is to provide a pressure-sensitive adhesive sheet having a high adhesiveness and exhibiting a reduced occurrence of the fogging phenomenon.

As a result of extensive studies for achieving the above object, the present inventors have found that the occurrence of the fogging phenomenon can be reduced with retaining a good adhesiveness when a pressure-sensitive adhesive tape wherein reflection rate and attached amount in the fogging test in accordance with German Industrial Standard DIN (Deutsche Industrie Normen) 75201 are predetermined values, respectively is used as a pressure-sensitive adhesive tape having a pressure-sensitive adhesive layer comprising an acrylic pressure-sensitive adhesive containing an acrylic polymer and a tackifying resin. The invention is accomplished based on these findings.

Namely, the present invention lies on a pressure-sensitive adhesive sheet comprising at least a pressure-sensitive adhesive layer comprising an acrylic pressure-sensitive adhesive containing an acrylic polymer composition containing an acrylic polymer as a main component and a tackifier containing a tackifying resin as a main component, wherein reflection rate and attached amount in the fogging test in accordance with German Industrial Standard DIN 75201 are 70% or more and 2.0 mg or less, respectively.

In the above pressure-sensitive adhesive sheet, in the acrylic pressure-sensitive adhesive which forms the pressure-sensitive adhesive layer, a ratio of components having a molecular weight of 300 or less is preferably 4.2% by weight or less based on the total amount of solid matter of the acrylic pressure-sensitive adhesive. Moreover, in the tackifying resin in the tackifier, a ratio of components having a molecular weight of 300 or less is preferably 4.2% by weight or less based on the total amount of solid matter of the tackifying resin.

In such a pressure-sensitive adhesive sheet, it is suitable that the acrylic polymer composition is a water-dispersion type acrylic polymer composition in which the acrylic polymer is contained in a water-dispersed state and the tackifier is a water-dispersion type tackifier in which a tackifying resin is contained in a water-dispersed state. In the above water-dispersion type tackifier, a ratio of components having a molecular weight of 300 or less is preferably 4.2% by weight or less based on the total amount of solid matter of the whole tackifying resin and emulsifier in the water-dispersion type tackifier.

Furthermore, in the invention, as the tackifying resin, a rosin-based tackifying resin can be suitably used.

The pressure-sensitive adhesive sheet of the invention can be suitably used at the time when a material for automobiles or a material for residential buildings is to be fixed.

Figure 1A:
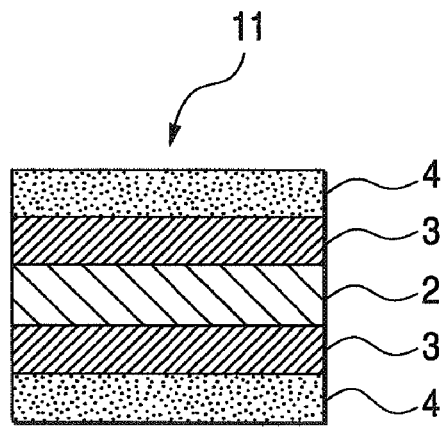
FIGS. 1A to 1F are outline cross-sectional views of the pressure-sensitive, adhesive sheets of the invention, respectively.

DESCRIPTION OF THE REFERENCE NUMERALS AND SIGNS 11 to 16 pressure-sensitive adhesive sheets, respectively
2 substrate
3 pressure-sensitive adhesive layer
4 release liner

DETAILED DESCRIPTION OF THE INVENTION

The following will describe embodiments of the invention in detail with reference to drawings according to needs. Incidentally, the same numerals are assigned to the same members or sites in some cases.

As shown in FIGS. 1A to 1F, the pressure-sensitive adhesive sheet of the invention has a constitution that a pressure-sensitive adhesive layer comprising an acrylic pressure-sensitive adhesive containing an acrylic polymer composition containing an acrylic polymer as a main component and a tackifier containing a tackifying resin as a main component is formed at least one surface of a support as well as has properties that reflection rate and attached amount in the fogging test in accordance with German Industrial Standard DIN 75201 are 70% or more and 2.0 mg or less, respectively. Thus, since the pressure-sensitive adhesive sheet has properties that a reflection rate in the fogging test in accordance with German Industrial Standard DIN 75201 (sometimes referred to as "fogging test reflection rate") is 70% or more and an attached amount in the fogging test in accordance with German Industrial Standard DIN 75201 (sometimes referred to as "fogging test attached amount") is 2.0 mg or less, the occurrence of the fogging phenomenon can be reduced. Needless to say, since a tackifying resin is used, a high adhesiveness can be secured. Therefore, in the pressure-sensitive adhesive sheet of the invention, the occurrence of the fogging phenomenon can be effectively reduced with securing a high adhesiveness.

In the pressure-sensitive adhesive sheet of the invention, the fogging test reflection rate is not particularly limited as far as it is 70% or more, and the higher the better. The fogging test reflection rate is suitably 80% or more, particularly 90% or more.

In the invention, the measurement of the fogging test reflection rate is carried out in accordance with German Industrial Standard DIN 75201-R. Specifically, the pressure-sensitive adhesive sheet is cut into a round shape having a diameter of 80 mm and allowed to stand in a state that the pressure-sensitive adhesive layer surface (pressure-sensitive adhesive surface) is exposed by peeling the release liner (in a state that only one pressure-sensitive adhesive surface is exposed in the case of a double-sided pressure-sensitive adhesive sheet wherein both sides are pressure-sensitive adhesive surfaces) and in a form that an exposed adhesive surface becomes an upper side at the inner bottom of a beaker (outer diameter: 90 mm, inner diameter: 83.6 mm, height: 190 mm; it is immersed in an oil bath of 100° C. until a height of 130 mm) heated by an oil bath at 100° C., and further a glass plate always cooled to 21° C. is placed on the upper surface of the beaker (fogging measuring instrument: apparatus name "N8-FOG" manufactured by HAAKE; an apparatus capable of heating a beaker, a flask, or the like by an oil bath and cooling the upper surface at 21° C.). After standing for 3 hours in such a state, the glass plate is taken out and a reflection rate (%) of the surface at a beaker inner side of the glass plate at the time when an incident light enters at an incident angle of 60° (sometimes referred to as "60° incident reflection rate of glass plate after test") is determined using a trade name "REFO 60 REFLEKTOMETER" (manufactured by PRLANGE) [60° incident reflection rate (%) of glass plate after test=intensity of incident light to glass plate after test/intensity of reflection light at the time when incident light enters glass plate after test×100]. In this case, beforehand, also with regard to the surface of the glass plate before the test, a reflection rate (%) at the time when an incident light enters at an incident angle of 60° (sometimes referred to as "60° incident reflection rate of glass plate before test") has been determined using the same apparatus as above [60° incident reflection rate (%) of glass plate before test=intensity of incident light to glass plate before test/intensity of reflection light at the time when incident light enters glass plate before test×100]. Then, using the following expression (1), a fogging test reflection rate (%) is calculated.

Fogging test reflection rate (%)=[60° incident reflection rate of glass plate after test (%)/60° incident reflection rate of glass plate before test (%)]×100    (1)

Moreover, in the pressure-sensitive adhesive sheet of the invention, the fogging test attached amount is not particularly limited as far as it is 2.0 mg or less, and the lower the better. The fogging test attached amount is suitably 1.5 mg or less, particularly 1.0 mg or less.

In the invention, the measurement of the fogging test attached amount is carried out in accordance with German Industrial Standard DIN 75201-W. Specifically, the pressure-sensitive adhesive sheet is cut into a round shape having a diameter of 80 mm and allowed to stand in a state that the pressure-sensitive adhesive layer surface (pressure-sensitive adhesive surface) is exposed by peeling the release liner (in a state that only one pressure-sensitive adhesive surface is exposed in the case of a double-sided pressure-sensitive adhesive sheet wherein both sides are pressure-sensitive adhesive surfaces) and in a form that an exposed adhesive surface becomes an upper side at the inner bottom of a beaker (outer diameter: 90 mm, inner diameter: 83.6 mm, height: 190 mm; it is immersed in an oil bath of 100° C. until a height of 130 mm) heated by an oil bath at 100° C., and further an aluminum-made sheet (so-called aluminum foil) always cooled to 21° C. is placed on the upper surface of the beaker (fogging measuring instrument: apparatus name "N8-FOG" manufactured by HAARE). After standing for 16 hours in such a state, the aluminum-made sheet is taken out and a weight thereof (weight of the aluminum-made sheet after test) was measured. In this case, beforehand, a weight of the aluminum-made sheet before the test (weight of the aluminum-made sheet before test) has been measured. Then, using the following expression (2), a fogging test attached amount (mg) is calculated.

Fogging test attached amount (mg)=(weight of aluminum-made sheet after test)−(weight of aluminum-made sheet before test)    (2)

Incidentally, FIGS. 1A to 1F are outline cross-sectional views of the pressure-sensitive adhesive sheets of the invention, respectively. In FIGS. 1A to 1F, 11 to 16 are pressure-sensitive adhesive sheets, 2 is a substrate, 3 is a pressure-sensitive adhesive layer, and 4 is a release liner. In this regard, the pressure-sensitive adhesive layer 3 is a pressure-sensitive adhesive layer comprising an acrylic pressure-sensitive adhesive containing an acrylic polymer composition containing an acrylic polymer as a main component and a tackifier containing a tackifying resin as a main component. The pressure-sensitive adhesive sheet 11 shown in FIG. 1A has a constitution that the pressure-sensitive adhesive layer 3 is formed on both sides of the substrate 2 as a support and also has a constitution that the pressure-sensitive adhesive layers 3 on both sides are each protected with the release liner 4 only one side of which is a release surface. Moreover, the pressure-sensitive adhesive sheet 12 shown in FIG. 1B has a constitution that the pressure-sensitive adhesive layer 3 is formed on both sides of the substrate 2 as a support and also has a constitution that the pressure-sensitive adhesive layer 3 on any one side is protected with the release liner 4 both sides of which are release surfaces as well as it may have a constitution that the pressure-sensitive adhesive layer 3 on the other side may be protected with the other release surface of the above release liner 4 by winding the pressure-sensitive adhesive sheet 12 in a roll form.

Figure 1B:
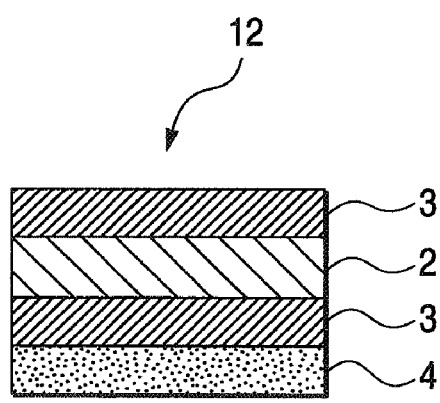
Figure 1C:
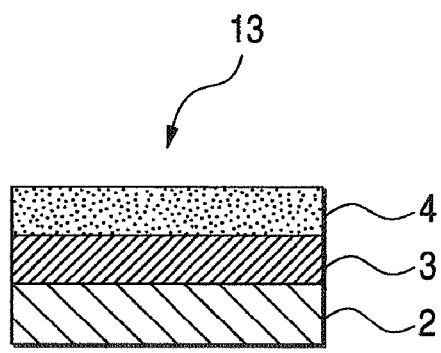

Moreover, the pressure-sensitive adhesive sheet 13 shown in FIG. 1C has a constitution that the pressure-sensitive adhesive layer 3 is formed on one side of the substrate 2 as a support and also has a constitution that the pressure-sensitive adhesive layer 3 is protected with the release liner 4 only one side of which is a release surface. The pressure-sensitive adhesive sheet 14 shown in FIG. 1D has a constitution that the pressure-sensitive adhesive layer 3 is formed on one side of the substrate 2 as a support and also the backside of the substrate 2 as a support is a release surface as well as it may have a constitution that the pressure-sensitive adhesive layer 3 may be protected with the release surface formed on the backside of the substrate 2 as the support by winding the pressure-sensitive adhesive sheet 14 in a roll form.

Figure 1D:
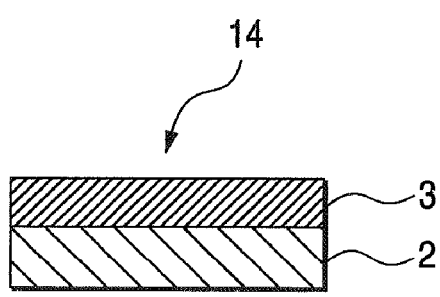
Figure 1E:
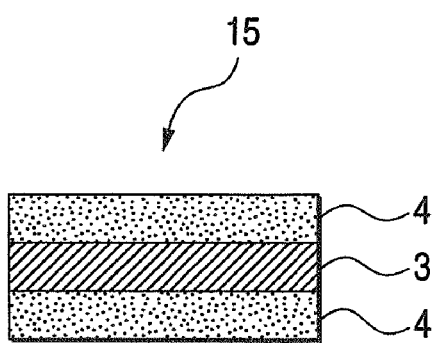

Furthermore, the pressure-sensitive adhesive sheet 15 shown in FIG. 1E has a constitution that the pressure-sensitive adhesive layer 3 is formed on one side of the release liner 4 (release surface side of a release liner only one side of which is a release surface) as a support and also has a constitution that the pressure-sensitive adhesive layer 3 is protected with the release liner 4 only one side of which is a release surface. The pressure-sensitive adhesive sheet 16 shown in FIG. 1F has a constitution that the pressure-sensitive adhesive layer 3 is formed on one side of the release liner 4 (a release liner both sides of which are release surfaces) as a support and also may have a constitution that the pressure-sensitive adhesive layer 3 may be protected with the other release surface of the release liner 4 as the support by winding the pressure-sensitive adhesive sheet 16 in a roll form.

As mentioned above, it is sufficient that the pressure-sensitive adhesive sheet of the invention has at least a pressure-sensitive adhesive layer comprising an acrylic pressure-sensitive adhesive containing an acrylic polymer composition containing an acrylic polymer as a main component and a tackifier containing a tackifying resin as a main component. For example, the sheet may be any of a pressure-sensitive adhesive sheet having a substrate (substrate-attached pressure-sensitive adhesive sheet) or a pressure-sensitive adhesive sheet having no substrate (substrate-less pressure-sensitive adhesive sheet). Moreover, the pressure-sensitive adhesive sheet may be any of a double-sided pressure-sensitive adhesive sheet wherein both sides are pressure-sensitive adhesive surfaces and a pressure-sensitive adhesive sheet wherein only one side is a pressure-sensitive adhesive surface. In this regard, in the case that the pressure-sensitive adhesive sheet is a substrate-less pressure-sensitive adhesive sheet, a support capable of exhibiting a peeling ability toward the pressure-sensitive adhesive layer (e.g., release liner) may be employed as a support.

Moreover, the pressure-sensitive adhesive sheet of the invention is adjusted so that the fogging test reflection rate and the fogging test attached amount become predetermined values. Therefore, it is important to use materials having small contents of volatile components or low-molecular-weight components as materials constituting the pressure-sensitive adhesive sheet. In particular, since the pressure-sensitive adhesive sheet has at least a pressure-sensitive adhesive layer, it is preferable to use materials having small contents of volatile components or low-molecular-weight components as materials constituting the pressure-sensitive adhesive layer. Specifically, the fogging test reflection rate and the fogging test attached amount can be regulated to 70% or more and 2.0 mg or less, respectively, by using, as the acrylic pressure-sensitive adhesive forming the pressure-sensitive adhesive layer, an acrylic pressure-sensitive adhesive wherein a ratio of components having a molecular weight of 300 or less is 4.2% by weight or less, particularly 4.1% by weight or less based on the total amount of solid matter of the acrylic pressure-sensitive adhesive. In this regard, the acrylic pressure-sensitive adhesive wherein a ratio of components having a molecular weight of 300 or less is 4.2% by weight or less based on the total amount of solid matter of the acrylic pressure-sensitive adhesive can be prepared by suitably selecting various components constituting the acrylic pressure-sensitive adhesive, e.g., an acrylic polymer, a tackifying resin, and the like.

[Pressure-sensitive Adhesive Layer]

As mentioned above, since the pressure-sensitive adhesive layer is made of a pressure-sensitive adhesive layer comprising an acrylic polymer composition containing an acrylic polymer as a main component and an acrylic pressure-sensitive adhesive containing a tackifier containing a tackifying resin as a main component. Therefore, volatile components or low-molecular-weight components relating to the occurrence of the fogging phenomenon are mainly contained in the tackifier in some cases.

(Tackifier)

The tackifier contains a tackifying resin as a main component. The tackifying resin is not particularly limited and examples thereof include rosin-based tackifying resins, terpene-based tackifying resins, hydrocarbon-based tackifying resins, epoxy-based tackifying resins, polyamide-based tackifying resins, elastomer-based tackifying resins, phenol-based tackifying resins, ketone-based tackifying resins, and the like. The tackifying resin can be used solely or in combination of two or more thereof.

Specifically, examples of the rosin-based tackifying resins include unmodified rosins (raw rosins) such as gum rosins; wood rosins, and tall oil rosins, modified rosins obtained by modifying the unmodified rosins by hydrogenation, disproportionation, polymerization, or the like (hydrogenated rosins, disproportionated rosins, polymerized rosins, and other chemically modified rosins) as well as various rosin derivatives and the like. Examples of the above rosin derivatives include rosin esters such as ester compounds of rosins obtained by esterifying unmodified rosins with alcohols and ester compounds of modified rosins obtained by esterifying modified rosins including hydrogenated rosins, disproportionated rosins, polymerized rosins, and the like with alcohols; unsaturated fatty acid-modified rosins obtained by modifying unmodified rosins or modified rosins (hydrogenated rosins, disproportionated rosins, polymerized rosins, and the like) with unsaturated fatty acids; unsaturated fatty acid-modified rosin esters obtained by modifying rosin esters with unsaturated fatty acids; rosin alcohols obtained by reducing the carboxyl group in unmodified rosins, modified rosins (hydrogenated rosins, disproportionated rosins, polymerized rosins, and the like), unsaturated fatty acid-modified rosins, or unsaturated fatty acid-modified rosin esters; metal salts of rosins (in particular, rosin esters) including unmodified rosins, modified rosins, and various rosin derivatives; and the like. In addition, there can be used rosin phenol resins obtained by adding phenol to rosins (unmodified rosins, modified rosins, and various rosin derivatives, and the like) in the presence of an acid catalyst, followed by thermal polymerization.

Examples of the terpene-based tackifying resins include terpene-based resins such as α-pinene polymers, β-pinene polymers, and dipentene polymers, modified terpene-based resins obtained by subjecting these terpene-based resins to modification (phenol-modification, aromatic modification, hydrogenation-modification, hydrocarbon-modification, or the like), e.g., terpene-phenol-based resins, styrene-modified terpene-based resins, aromatic modified terpene-based resins, hydrogenated terpene-based resins, etc., and the like.

Examples of the hydrocarbon-based tackifying resins include various hydrocarbon-based resins such as aliphatic hydrocarbon resins [polymers of aliphatic hydrocarbons, e.g., olefins and dienes having 4 to 5 carbon atoms (olefins such as butene-1, isobutylene, pentene-1; dienes such as butadiene, 1,3-pentadiene, and isoprene)], aromatic hydrocarbon resins [polymers of vinyl group-containing aromatic hydrocarbons having 8 to 10 carbon atoms (styrene, vinyltoluene, α-methylstyrene, indene, methylindene, etc.)], aliphatic cyclic hydrocarbon resins [alicyclic hydrocarbon resins obtained by cyclizing and -dimerizing so-called "C4 petroleum fraction" or "C5 petroleum fraction" and subsequently polymerizing the product, polymers of cyclic diene compounds (cyclopentadiene, dicyclopentadiene, ethylidenenorbornene, dipentene, etc.) or hydrogenation products thereof, alicyclic hydrocarbon resins obtained by hydrogenating aromatic ring of the following aromatic hydrocarbon resins or aliphatic and aromatic petroleum resins, and the like], aliphatic and aromatic petroleum resins (styrene-olefin copolymers and the like), aliphatic and alicyclic petroleum resins, hydrogenated hydrocarbon resins, coumarone-based resins, and coumarone-indene based resins.

In the invention, as the tackifying resins, the rosin-based tackifying resins, particularly the rosin resins (unmodified rosins); rosin-based resins (modified rosins) subjected to modifications such as polymerization, and disproportionation, hydrogenation; rosin esters such as ester compounds of rosins and ester compounds of modified rosins are suitably employed.

As the tackifying resins, in order to achieve a high adhesiveness in the pressure-sensitive adhesive sheets, a tackifying resin having a softening point (softening temperature) of 120° C. or higher (preferably 130° C. or higher, more preferably 140° C. or higher) measured by the ring and ball method specified in JIS K 5902 is suitable. In this regard, the upper limit of the softening point of the tackifying resin is not particularly limited and may be, for example, 170° C. or lower (preferably 160° C. or lower, more preferably 155° C. or lower).

In particular, in the invention, as the tackifying resin in the tackifier, a tackifying resin, particularly rosin-based tackifying resin, wherein a ratio of components having a molecular weight of 300 or less is 4.2% by weight or less, particularly 4.1% by weight or less, based on the total amount of solid matter of the tackifying resin can be suitably used from the viewpoint that the fogging test reflection rate and the fogging test attached amount are made 70% or more and 2.0 mg or less, respectively.

In this regard, as the tackifying resin wherein a ratio of components having a molecular weight of 300 or less is 4.2% by weight or less based on the total amount of solid matter of the tackifying resin, there may be mentioned (1) a tackifying resin prepared so that the ratio of components having a molecular weight of 300 or less is 4.2% by weight or less based on the total amount of solid matter of the tackifying resin, (2) a tackifying resin prepared by subjecting a tackifying resin prepared by any of various methods (therefore, in the tackifying resin, the ratio of components having a molecular weight of 300 or less may exceed 4.2% based on the total amount of solid matter of the tackifying resin) to a thorough removing treatment of low-molecular-weight components (particularly, components having a molecular weight of 300 or less), and the like. As the above removing treatment of the low-molecular-weight components, known methods for the removing treatment (e.g., steam distillation) can be utilized.

The tackifier may have a form constituted by the tackifying resin alone or may have a form that a tackifying resin is dissolved or dispersed in a medium. In the invention, the tackifier is suitably a water-dispersion type tackifier (tackifying resin-containing emulsion) in which a tackifying resin is contained in a water-dispersed state.

The water-dispersion type tackifier can be prepared by dissolving or melting the tackifying resin according to needs and subsequently dispersing it in water. An emulsifier can be employed at the dispersion of the tackifying resin in water. As the emulsifier, any forms of emulsifiers may be used but anionic emulsifiers and nonionic emulsifiers can be suitably used. Examples of the anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxyethylenesulfosuccinate; and the like. In addition, examples of the nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; and the like.

The amount of the emulsifier to be used is not particularly limited as far as it is an amount capable of preparing the tackifying resin in an emulsion form. For example, the amount can be selected from the range of about 0.2 to 10% by weight, preferably from 0.5 to 5% by weight based on the total amount of the tackifying resin (solid matter).

Incidentally, the emulsifier at the preparation of the water-dispersion type tackifier may be the same as or different from the emulsifier at the preparation of the water-dispersion type acrylic polymer to be mentioned below. However, when one of the emulsifiers is an anionic emulsifier, it is preferable to use an anionic emulsifier as another one, too. Moreover, when one of the emulsifiers is a nonionic emulsifier, it is preferable to use a nonionic emulsifier as another one, too.

In the invention, as the water-dispersion type tackifier, a water-dispersion type tackifier wherein a ratio of components having a molecular weight of 300 or less is 4.2% by weight or less (particularly, 4.1% by weight or less) based on the total amount of solid matter of the whole tackifying resin and emulsifier in the water-dispersion type tackifier can be suitably used from the viewpoint that the fogging test reflection rate and the fogging test attached amount are made 70% or more and 2.0 mg or less, respectively.

In this regard, as the water-dispersion type tackifier wherein a ratio of components having a molecular weight of 300 or less is 4.2% by weight or less based on the total amount of solid matter of the whole tackifying resin and emulsifier in the water-dispersion type tackifier, there may be mentioned (1) a water-dispersion type tackifier prepared using, as the tackifying resin and emulsifier, a tackifying resin prepared so that the ratio of components having a molecular weight of 300 or less is 4.2% by weight or less based on the total amount of solid matter of the tackifying resin and an emulsifier prepared so that the ratio of components having a molecular weight of 300 or less is 4.2% by weight or less based on the total amount of solid matter of the emulsifier, (2) a water-dispersion type tackifier prepared by subjecting a water-dispersion type tackifier prepared by emulsifying a tackifying resin prepared by any of various methods (therefore, in the tackifying resin, the ratio of components having a molecular weight of 300 or less may exceed 4.2% based on the total amount of solid matter of the tackifying resin) with an emulsifier prepared by any of various methods (therefore, in the emulsifier, the ratio of components having a molecular weight of 300 or less may exceed 4.2% based on the total amount of solid matter of the emulsifier) to a thorough removing treatment of low-molecular-weight components (particularly, components having a molecular weight of 300 or less), and the like. As the above removing treatment of the low-molecular-weight components, known methods for the removing treatment (e.g., the removing treatment by a steam distillation) can be utilized.

As the water-dispersion type tackifier wherein a ratio of components having a molecular weight of 300 or less is 4.2% by weight or less based on the total amount of solid matter of the whole tackifying resin and emulsifier in the water-dispersion type tackifier, there may be, for example, used commercially available products such as a trade name "Super Ester E-720", a trade name "04-039", and a trade name "04-021" (all manufactured by Arakawa Chemical Industries, Ltd.).
(Acrylic Polymer Composition)

The acrylic polymer composition contains an acrylic polymer as a main component. The above acrylic polymer is used as a base polymer of the acrylic pressure-sensitive adhesive (elemental component of the pressure-sensitive adhesive). The acrylic polymer is not particularly limited but, as a main constituting monomer component (main component of monomer), an alkyl(meth)acrylate (alkyl acrylate or alkyl methacrylate) is preferably used. As the above alkyl(meth)acrylate, an acrylic compound represented by the following formula (1):

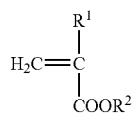

(1)

wherein $R^1$ represents a hydrogen atom or a methyl group and $R^2$ represents an alkyl group,
can be suitably used.

In the above formula (1), $R^1$ is a hydrogen atom or a methyl group and $R^2$ is an alkyl group. Specifically, examples of the alkyl group for $R^2$ include alkyl groups (linear or branched alkyl groups) having 1 to 18 carbon atoms, such as a methyl group, an ethyl group, an propyl group, an isopropyl group, a butyl group, an isobutyl group, an s-butyl group, a t-butyl group, a pentyl group, an isoamyl group, a neopentyl group, a hexyl group, a heptyl group, an octyl group, an isooctyl group, a 2-ethylhexyl group, a nonyl group, an isononyl group, a decyl group, an isodecyl group, an undecyl group, a dodecyl group (lauryl group), a tridecyl group, a tetradecyl group, a pentadecyl group, a hexadecyl group, a heptadecyl group, and an octadecyl group (stearyl group). As the alkyl group for $R^2$, an alkyl group having 2 to 14 carbon atoms is preferable and furthermore, an alkyl group having 2 to 10 carbon atoms is suitable.

Specifically, examples of the alkyl(meth)acrylate include butyl(meth)acrylate, isobutyl(meth)acrylate, s-butyl(meth)acrylate, t-butyl(meth)acrylate, pentyl(meth)acrylate, isoamyl(meth)acrylate, neopentyl(meth)acrylate, hexyl(meth)acrylate, heptyl(meth)acrylate, 2-ethylhexyl(meth)acrylate, octyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, and the like. The alkyl(meth)acrylate may be used solely or in combination of two or more thereof.

As the monomer components constituting the acrylic polymer, as far as an alkyl(meth)acrylate is used as a main component of the monomer, the other monomer component copolymerizable with the alkyl(meth)acrylate (sometimes referred to as "copolymerizable monomer component") may be used. In this regard, the ratio of the alkyl(meth)acrylate to the total amount of the monomer components constituting the acrylic polymer is desirably 50% by weight or more. When the ratio of the alkyl(meth)acrylate is less than 50% by weight based on the total amount of the monomer components constituting the acrylic polymer, the properties as an acrylic polymer are hardly exhibited in some cases.

The copolymerizable monomer component can be used for introducing a crosslinking site into the acrylic polymer or enhancing an aggregating ability of the acrylic polymer. The copolymerizable monomer component may be used solely or in combination of two or more thereof.

Specifically, in order to introduce a crosslinking site into the acrylic polymer, a functional group-containing monomer component, especially a thermally crosslinkable functional group-containing monomer component for introducing a thermally crosslinking site into the acrylic polymer, can be used as the copolymerizable monomer component. The use of the functional group-containing monomer component can enhance adhesive force toward the article to be adhered. Such a functional group-containing monomer component is not particularly limited as far as it is a monomer component copolymerizable with the alkyl(meth)acrylate and having a functional group which becomes a crosslinking site. Examples thereof include carboxyl group-containing monomers such as (meth)acrylic acid, itaconic acid, crotonic acid, maleic acid, fumaric acid, and isocrotonic acid or acid anhydrides thereof such as maleic anhydride and itaconic anhydride; hydroxyl group-containing monomers, e.g., hydrokyalkyl(meth)acrylates such as 2-hydroxyethyl(meth)acrylate, 2-hydroxypropyl(meth)acrylate, and 2-hydroxybutyl(meth)acrylate and also vinyl alcohol and allyl alcohol; amide-based monomers such as (meth)acrylamide, N,N-dimethyl(meth)acrylamide, N-butyl(meth)acrylamide, N-methylol(meth)acrylamide, N-methylolpropane(meth)acryl-amide, N-methoxymethyl(meth)acrylamide, and N-butoxymethyl(meth)acrylamide; amino group-containing monomers such as aminoethyl (meth)acrylate, N,N-dimethylaminoethyl(meth)acrylate, and t-butylaminoethyl(meth)acrylate; epoxy group-containing monomers such as glycidyl(meth)-acrylate and methylglycidyl(meth)acrylate; cyano-containing monomers such as acrylonitrile and methacrylonitrile; monomers having a nitrogen atom-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine; and the like. As the functional group-containing monomer component, a carboxyl group-containing monomer such as acrylic acid or an acid anhydride thereof can be suitably used.

Moreover, as the copolymerizable monomer component, the other copolymerizable monomer component can be used in order to enhance the aggregating ability of the acrylic polymer. Examples of the other copolymerizable monomer component include vinyl ester-based monomers such as vinyl acetate and vinyl propionate; styrene-based monomers such as styrene, substituted styrene (α-methylstyrene, etc.), and vinyltoluene; non-aromatic ring-containing(meth)acrylate esters such as cycloalkyl(meth)acrylates [cyclohexyl(meth) acrylate, cyclopentyl di(meth)acrylate, etc.] and bornyl (meth)acrylate and isobornyl(meth)acrylate; aromatic ring-containing (meth)acrylate esters such as aryl(meth)acrylate [phenyl (meth)acrylate, etc.], aryloxyalkyl(meth)acrylate [phenoxyethyl(meth)acrylate, etc.], and arylalkyl(meth)acrylates [benzyl(meth)acrylate]; olefinic monomers such as ethylene, propylene, isoprene, butadiene, and isobutylene; vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl(meth)acrylate; vinyl ether-based monomers such as methyl vinyl ether and ethyl vinyl ether; and also polyfunctional monomers such as 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, polypropylene glycol di(meth)acrylate, neopentyl glycol di(meth)acrylate, pentaerythritol di(meth) acrylate, trimethylolpropane tri(meth)acrylate, pentaerythritol tri(meth)acrylate, dipentaerythritol hexa(meth)acrylate, glycerin di(meth)acrylate, epoxy acrylates, polyester acrylates, urethane acrylates, divinylbenzene, butyl di(meth)acrylate, and hexyl di(meth)acrylate; and the like.

As the monomer components [alkyl(meth)acrylates, copolymerizable monomer components, and the like] constituting the acrylic polymer, from the viewpoint of suppressing or preventing the occurrence of the fogging phenomenon, it is preferable to avoid the use of monomer components having a high boiling point, which hardly vaporize at drying, as far as possible. From the viewpoint, as the monomer components constituting the acrylic polymer, it is desirable to use monomer components having a boiling point of 300° C. or lower, preferably 250° C. or lower.

As the process for polymerizing the acrylic polymer, known or conventional polymerization processes, e.g., an emulsion polymerization process, a solution polymerization process, a suspension polymerization process, and the like, can be adopted. At the polymerization, various polymerization processes such as a general all-components-charging process (at once polymerization process), a monomer-dropping process (continuously dropping process, portion-wise dropping process, etc.) can be adopted. The polymerization temperature can be suitably selected according to the kind of the monomer, the kind of an initiator, and the like and can be, for example, selected from the range of 20 to 100° C.

The polymerization initiator to be used at the polymerization can be suitably selected from known or conventional polymerization initiators (azo polymerization initiators, persulfate salt-based polymerization initiators, peroxide-based polymerization initiators, redox system polymerization initiators, etc.) according to the kind of the polymerization process. Examples of the polymerization initiators include azo polymerization initiators such as 2,2'-azobisisobutyronitrile, 2,2'-azobis(2-methylpropion-amidine)disulfate, 2,2'-azobis (2-amidinopropane)dihydrochloride, 2,2'-azobis[2-(5-methyl-2-imidazolin-2-yl)propane]dihydrochloride, 2,2'-azobis (N,N'-dimethyleneisobutylamidine), 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl-propionate), and 2,2'-azobis[N-(2-carboxyethyl)-2-methylpropionamide]hydrate; persulfate salt-based polymerization initiators such as potassium persulfate and ammonium persulfate; peroxide-based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, 1,1-bis(t-butylperoxy) cyclododecane, and hydrogen peroxide; substituted ethane-based polymerization initiators such as phenyl-substituted ethane; aromatic carbonyl compounds; and redox system initiators by combining peroxides and reducing agents [e.g., combinations of peroxides and ascorbic acid (a combination of a hydrogen peroxide solution and ascorbic acid, and the like combinations), combinations of peroxides and iron(II) salts (a combination of a hydrogen peroxide solution and an iron(II) salt, and the like combinations), combinations of persulfate salts and sodium hydrogen sulfite, and the like combinations]. The polymerization initiator may be used solely or in combination of two or more thereof.

The amount of the polymerization initiator to be used may be a usually used amount and can be, for example, selected from the range of about 0.01 to 1 part by weight, preferably 0.02 to 0.5 part by weight relative to 100 parts by weight of the total monomer components.

Moreover, at the polymerization, a chain transfer agent can be used for regulating the molecular weight. As the chain transfer agent, known or conventional chain transfer agents can be used and examples thereof include mercaptans such as dodecanetiol (lauryl mercaptan), glycidyl mercaptane, 2-mercaptoethanol, mercaptoacetic acid, 2-ethylhexyl thioglycolate, and 2,3-dimercapto-1-propanol and also α-methylstyren dimer. The chain transfer agent may be used solely or in combination of two or more thereof. The amount of the chain transfer agent to be used may be a usually used amount and can be, for example, selected from the range of about 5 parts by weight or less, e.g., 0 to 5 parts by weight, preferably 0 to 1 part by weight relative to 100 parts by weight of the total monomer components.

The acrylic polymer composition may have a form constituted by an acrylic polymer alone or may have a form that an acrylic polymer is dissolved or dispersed in a medium. In the invention, the acrylic polymer composition is suitably a water-dispersion type acrylic polymer composition in which an acrylic polymer is contained in a water-dispersed state.

Since the water-dispersion type acrylic polymer composition is in an emulsion form, the water-dispersion type acrylic polymer composition may be prepared using a polymer as it is in an emulsion form prepared utilizing an emulsion polymerization process or the water-dispersion type acrylic polymer composition may be prepared by dispersing an acrylic polymer prepared utilizing a polymerization process other than the emulsion polymerization process in water. In this regard, an emulsifier can be used at the emulsion polymerization and at the dispersion of the acrylic polymer in water.

Specifically, the emulsifier may be in any forms but anionic emulsifiers or nonionic emulsifiers can be suitably used. Examples of the anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxy-ethylenesulfosuccinate; and the like. Moreover, examples of the nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; and the like.

The amount of the emulsifier to be used is not particularly limited as far as it is an amount capable of preparing the acrylic polymer in an emulsion form. For example, the amount can be selected from the range of about 0.3 to 10 parts by weight, preferably about 0.5 to 5 parts by weight relative to 100 parts by weight of the acrylic polymer or monomer components. When the amount of the emulsifier to be used is less than 0.3 part by weight relative to 100 parts by weight of the acrylic polymer or monomer components, polymerization stability cannot be retained and aggregates may formed in some cases. On the other hand, when it exceeds 10 parts by weight, properties as the water-dispersion type acrylic polymer (acrylic polymer emulsion) are hardly exhibited in some cases.

As the emulsifier, from the viewpoint of suppressing or preventing the occurrence of the fogging phenomenon, it is preferable to avoid the use of a low-molecular-weight emulsifier as far as possible. From the viewpoint, as the emulsifier, it is desirable to use an emulsifier having a molecular weight (weight average molecular weight in the case of polymer) of 200 or more (preferably 300 or more).

Incidentally, in the case that the acrylic polymer composition is a water-dispersion type acrylic polymer composition, water is used as an aqueous medium but, if necessary, an aqueous medium to which a water-soluble solvent such as an alcohol is added in a small amount may be also used. At the preparation of the water-dispersion type acrylic polymer composition by emulsion polymerization, the amount of the aqueous medium may be suitably determined according to the ratio relative to an emulsifying liquid to be introduced into a system by dropwise addition or the like. The concentration of solid matter of the water-dispersion type acrylic polymer composition is desirably 20 to 80% by weight (preferably 30 to 70% by weight).

(Other Components)

In the acrylic pressure-sensitive adhesive for forming the pressure-sensitive adhesive layer, a crosslinking agent may be used, if necessary. The crosslinking agent is not particularly limited and can be suitably selected from known or conventional crosslinking agents, e.g., isocyanate-based crosslinking agents, epoxy-based crosslinking agents, oxazolidine-based crosslinking agents, aziridine-based crosslinking agents, melamine-based crosslinking agents, peroxide-based crosslinking agents, urea-based crosslinking agents, metal alkoxide-based crosslinking agents, metal cheletebased crosslinking agents, metal salt-based crosslinking agents, carbodiimide-based crosslinking agents, aminebased crosslinking agents, and the like. Moreover, the acrylic pressure-sensitive adhesive for forming the pressure-sensitive adhesive layer may contains the other additives, e.g., a pH buffering agent, a neutralizing agent, a foam inhibitor, a stabilizer, an antiaging agent, a UV absorber, an antioxidant, a light stabilizer, a peeling regulator, a plasticizer, a softening agent, a filler, a colorant (pigment, dye, etc.), a surfactant, an antistatic agent, and the like.

In the invention, as mentioned above, an acrylic pressure-sensitive adhesive containing an acrylic polymer composition and a tackifier is used. The ratio of the acrylic polymer composition to the tackifier is not particularly limited and can be suitably selected according to the degree of aimed pressure-sensitive adhesiveness. As the tackifier, it is desirable to use the tackifying resin in the tackifier so as to be a ratio of 10 to 100 parts by weight, preferably 15 to 80 parts by weight, further preferably 20 to 60 parts by weight relative to 100 parts by weight of the acrylic polymer in the acrylic polymer composition. When the tackifier is mixed so that the tackifying resin in the tackifier is in a mixing amount of less than 10 parts by weight relative to 100 parts by weight of the acrylic polymer in the acrylic polymer composition, an addition effect of the tackifier is insufficient and thus aimed pressure-sensitive adhesive force is not obtained in some cases. On the other hand, when it is mixed in a mixing amount exceeding 100 parts by weight, compatibility with the acrylic polymer is poor and hence pressure-sensitive adhesive force decreases in some cases.

As the acrylic pressure-sensitive adhesive, a water-dispersion type acrylic pressure-sensitive adhesive containing a water-dispersion type acrylic polymer composition and a water-dispersion type tackifier is suitable.

The pressure-sensitive adhesive layer can be formed by applying, on a predetermined surface, an acrylic pressure-sensitive adhesive, followed by drying or curing. At the application of the acrylic pressure-sensitive adhesive, a conventional coater, e.g., a gravure roll coater, a reverse roll coater, a kiss roll coater, a dip roll coater, a bar coater, a knife coater, a spray coater, or the like, can be employed.

The thickness of the adhesive layer can be suitably selected from the range of 2 to 150 µm, preferably 5 to 100 µm, for example.

Incidentally, when a crosslinking agent is used in the acrylic pressure-sensitive adhesive, the adhesive layer can be formed by effecting crosslinking through thermal crosslinking by heating. The thermal crosslinking can be achieved by conventional methods, depending on the kind of the crosslinking agent, e.g., a method of heating to a temperature at which a crosslinking reaction proceeds. The amount of solvent-insoluble matter (crosslinked product of the acrylic polymer) of the pressure-sensitive adhesive layer after crosslinking is not particularly limited but is preferably about 15 to 70% by weight. Moreover, in this case, the molecular weight (weight average molecular weight, in terms of standard polystyrenes) of solvent-soluble matter of the pressure-sensitive adhesive layer after crosslinking is, for example, about 100,000 to 600,000, preferably 200,000 to 450,000. The molecular weight of solvent-soluble matter can be measured by means of gel permeation chromatograph (GPC). Specifically, using a trade name "HLC-8120GPC" (manufactured by TOSOH Corporation) as an analyzing apparatus and a trade name "TSKgel GMH-H(S)×2 (7.8 mm I.D.×300 mm, 40° C.) as columns, measurement is conducted under conditions of a flow rate: 0.5 mL/minute and a detector: RI.

The ratio of the solvent-insoluble matter of the pressure-sensitive adhesive layer after crosslinking and the molecular weight (weight average molecular weight) of the solvent-soluble matter can be optionally set by suitably adjusting, for example, the ratio of a functional group-containing monomer component to total monomer components constituting the acrylic polymer, the kind of the chain transfer agent or the ratio thereof, the kind of the crosslinking agent or the ratio thereof, and the like.

[Support]

In the pressure-sensitive adhesive sheet of the invention, as a support, a substrate or a release liner can be suitably used. As mentioned above, when the support is a substrate, the pressure-sensitive adhesive sheet is a substrate-attached pressure-sensitive adhesive sheet. When the support, is not a substrate but a release liner, the pressure-sensitive adhesive sheet is a substrate-less pressure-sensitive adhesive sheet. Therefore, the release liner in the substrate-attached pressure-sensitive adhesive sheet [e.g., release liners 4 in FIGS. 1A to 1C] is not included in the support but the release liner in the substrate-less pressure-sensitive adhesive sheet [e.g., release liners 4 in FIGS. 1E and 1F, etc.] is included in the support. Thus, the release liner as a support supports the pressure-sensitive adhesive layer and also can protect the surface of the pressure-sensitive adhesive layer.

In the support, example of the substrate include plastic sheets or films such as sheets or films made of polyolefins (sheets or films made of polyethylene, sheets or films made of polypropylene, sheets or films made of ethylene-propylene copolymers, etc.), sheets or films made of polyesters (sheets or films made of polyethylene terephthalate, etc.), sheets or films made of vinyl chloride-based resins, sheets or films made of vinyl acetate-based resins, sheets or films made of polyimide-based resins, sheets or films made of polyamide-based resins, sheets or films made of fluorocarbon resins, and cellophanes; papers such as Japanese papers, kraft paper, glassine paper, wood free paper, synthetic paper, top coat paper, etc.; fabrics of single or blended woven fabrics and nonwoven fabrics composed of natural fibers, semi-synthetic fibers, and synthetic fibers, such as cotton fiber, staple fiber, Manila fiber, pulp, rayon, acetate fiber, polyester fiber, polyvinyl alcohol fiber, polyamide fiber, and polyolefin fiber; rubber sheets composed of natural rubber, butyl-rubber, etc.; foam sheets made of foams composed of polyurethanes, polychloroprene rubber, etc.; metal foils such as aluminum foil, copper foil, etc.; and composites thereof. The above plastic sheets or films may be any of non-stretched types or stretched types (uniaxially stretched types or biaxially stretched types). The substrate may be in a single layer form or may be in a laminated form.

Incidentally, the substrate may be mixed with various additives such as a filler (inorganic filler, organic filler, etc.), an antiaging agent, an antioxidant, a UV absorber, a lubricant, a plasticizer, and a colorant (pigment, dye, etc.).

The surface of the substrate (especially, surface at the polymer layer side) may be subjected to a suitable known or conventional surface treatment, e.g., a physical treatment such as a corona discharge treatment or a plasma treatment, a chemical treatment such as an under coat treatment or a backside-treatment, or the like.

The thickness of the substrate can be suitably selected according to the purpose but, in general, is from about 10 to 200 μm, preferably from about 20 to 100 μm.

(Release Liner)

In the support, the release liner is not particularly limited and can be suitably selected from known release liners. As the release liner, a substrate having a release treatment layer treated with a release treatment agent at least one surface can be suitably used. In addition, low-adhesive substrates composed of fluorocarbon polymers, e.g., polytetrafluoroethylene, polychlorotrifluoro-ethylene, polyvinyl fluoride, polyvinylidene fluoride, a tetrafluoroethylene-hexafluoropropylene copolymer, a chlorofluoroethylene-vinylidene fluoride copolymer, etc., and low-adhesive substrates composed of non-polar polymers (e.g., olefin-based resins such as polyethylene and polypropylene) can be also employed.

As the substrate of the release liner, plastic sheets or films are suitably used but papers, fabrics, rubber sheets, foam sheets, metal foils, and the like exemplified as the substrates for the support can be also used. The plastic sheets and films for the substrate of the above release liner are not particularly limited and can be, for example, suitably selected from the plastic sheets and films exemplified as the substrates for the support.

Moreover, as the release treatment agent for forming the release treatment layer, known or conventional release treatment agents (silicone-based release treatment agents, fluorine-based release treatment agents, long-chain alkyl-based release treatment agents, etc.) can be used.

The thickness of the substrate or the release treatment layer in the release liner is not particularly limited and can be suitably selected according to the purpose. For example, the total thickness of the release liner is preferably 15 μm or more, more preferably from 25 to 500 μm.

Incidentally, the release liner in the substrate-less pressure-sensitive adhesive sheet can be suitably selected from the release liners exemplified as the release liner as a support. The release liner which protects the surface of the pressure-sensitive adhesive layer and the release liner as a support may have the same constitution or may have different constitutions.

[Pressure-sensitive Adhesive Sheet]

In the invention, the pressure-sensitive adhesive sheet means a sheet-shape pressure-sensitive adhesive article having or capable of having a form of sheet-shape article having a pressure-sensitive adhesive layer. Specifically, the pressure-sensitive adhesive sheet includes a pressure-sensitive adhesive tape, a pressure-sensitive adhesive sheet, a pressure-sensitive adhesive film, a pressure-sensitive adhesive label, or the like.

As far as the above pressure-sensitive adhesive sheet has the pressure-sensitive adhesive layer, the sheet may have other layers (e.g., an intermediate layer, an under coat layer, etc.) within the range where the advantages of the invention are not impaired.

Such a pressure-sensitive adhesive sheet can be produced in accordance with the process for producing usual pressure-sensitive adhesive tapes and pressure-sensitive adhesive sheets depending on the kind of the pressure-sensitive adhesive sheet. Specifically, in the case that the pressure-sensitive adhesive sheet is a substrate-attached type, the substrate-attached type pressure-sensitive adhesive sheet can be, for example, prepared by (1) a preparation method comprising applying an acrylic pressure-sensitive adhesive containing an acrylic polymer composition and a tackifier on at least one surface (one side or both sides) of a substrate so that the thickness after drying becomes a predetermined thickness and subsequently drying the adhesive to form a pressure-sensitive adhesive layer, (2) a preparation method comprising applying, on a separator, an acrylic pressure-sensitive adhesive containing an acrylic polymer composition and a tackifier so that the thickness after drying becomes a predetermined thickness, drying the adhesive to form a pressure-sensitive adhesive layer, and subsequently transferring the pressure-sensitive adhesive layer onto at least one surface (one side or both sides) of a substrate; or the like method.

On the other hand, in the case that the pressure-sensitive adhesive sheet is a substrate-less type, the substrate-less type pressure-sensitive adhesive sheet can be, for example, prepared by (1) a preparation method comprising applying an acrylic pressure-sensitive adhesive containing an acrylic polymer composition and a tackifier on at least one release surface (surface of release treatment layer, surface of low-adhesive substrate, etc.) of a release liner so that the thickness after drying becomes a predetermined thickness and subsequently drying the adhesive to form a pressure-sensitive adhesive layer; or the like method.

Figure 1F:
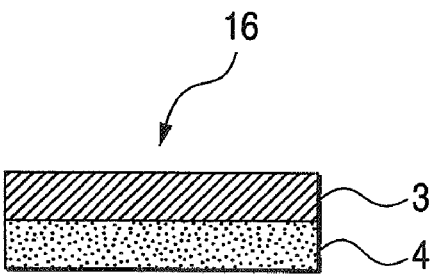

Incidentally, the pressure-sensitive adhesive sheets shown in FIGS. 1B, 1D, and 1F can be wound into a roll with overlaying the pressure-sensitive adhesive surface at one side of the pressure-sensitive adhesive sheet (surface of the pressure-sensitive adhesive layer) on the release surface at another side (surface of the backside treated layer of the substrate, surface of the release treatment layer of the release liner, etc.) to prepare pressure-sensitive adhesive sheets (pressure-sensitive adhesive tape, etc.) in a form wound into a roll.

Moreover, when crosslinking is conducted at the formation of the pressure-sensitive adhesive layer, the crosslinking can be achieved through a predetermined production step by a known or conventional crosslinking method depending on the kind of a crosslinking agent (e.g., a thermally crosslinkable type crosslinking agent which achieves crosslinking by heating, a photo-crosslinkable crosslinking agent which achieves crosslinking by UV irradiation, or the like). For example, when the crosslinking agent used is a thermally crosslinkable type crosslinking agent, crosslinking can be achieved at the time when the acrylic pressure-sensitive adhesive is dried after its application in parallel with or simultaneous with the drying by allowing a thermally crosslinking reaction to proceed. Specifically, depending on the kind of the thermally crosslinkable type crosslinking agent, crosslinking can be achieved together with drying by heating to a temperature higher than the temperature at which the crosslinking reaction proceeds.

Since the pressure-sensitive adhesive sheet of the invention has a high adhesiveness and exhibits a reduced occurrence of the fogging phenomenon, influence on human bodies can be reduced even when it is utilized in the applications in closed spaces, such as materials for automobiles, e.g., interior materials for automobiles and materials for residential buildings, e.g., house building materials. Therefore, the pressure-sensitive adhesive sheet of the invention can be suitably used at the time when a material for automobiles or a material for residential buildings is to be fixed. In the case that the pressure-sensitive adhesive sheet of the invention is used at the time when a material for automobiles is to be fixed, the sheet can be suitably used at the fixing of ceiling materials or various panels for automobiles.

Moreover, in the case that the pressure-sensitive adhesive sheet is used at the time when a material for automobiles is to be fixed, as the pressure-sensitive adhesive properties of the pressure-sensitive adhesive sheet (pressure-sensitive adhesive sheet for interior materials for automobiles), an adhesive force under an environment of 23° C. is preferably 10 N/20 mm or more, further, an adhesive force under an environment of 70° C. is suitably 5 N/20 mm or more, and moreover, a retentive force under an environment of 40° C. is preferably 2 mm or less.

In this regard, the pressure-sensitive adhesive force (23° C. or 70° C.) of the pressure-sensitive adhesive sheet is determined by attaching under pressure the pressure-sensitive adhesive sheet to a stainless plate (SUS plate) polished with an abrasive paper having a particle size of No. 280 using a method wherein a rubber roller having a weight of 2 kgf is once reciprocated, allowing it to stand under an environment of 23° C. or 70° C. for 30 minutes, and subsequently measuring a force required for peeling under an atmosphere of 23° C. or 70° C. (180° peeling, peeling rate 300 mm/minute) using a tensile tester.

The retentive force (23° C.) is determined by attaching the pressure-sensitive adhesive sheet cut into a width of 10 mm to a phenol resin plate at a contact area of 10 mm×20 mm, allowing it to stand over night (12 hours), further allowing it to stand under an atmosphere of 40° C. for 30 minutes, hanging down the phenol resin plate under an environment of 23° C., loading a homogeneous load of 500 g at a free end of the pressure-sensitive adhesive sheet, and measuring a shifted distance of the pressure-sensitive adhesive sheet after 1 hour of standing.

The pressure-sensitive adhesive sheet of the invention has a high adhesiveness and exhibits a reduced occurrence of a fogging phenomenon. Therefore, it is suitable as a pressure-sensitive adhesive sheet for use at the time when a material for automobiles or a material for residential buildings is to be fixed.

The following will explain the invention more specifically with reference to Examples. In the following, "part(s)" means "part(s) by weight" and "%" means "% by weight".

EXAMPLE 1

Using a reaction vessel (separable flask) fitted with a condenser tube, a nitrogen-inlet tube, a thermometer, and a stirrer, 0.1 part of 2,2'-azobis[N-(2-carboxyethyl)-2-methylpropionamidine] hydrate (trade name "VA-057" manufactured by Wako Pure Chemical Industries, Ltd.) as a polymerization initiator and 40 parts of ion exchange water were charged thereto and the whole was stirred for 1 hour and heated to 60° C. with introducing nitrogen gas. Thereafter, an emulsified product obtained by adding 68 parts of butyl acrylate, 29 parts of 2-ethylhexyl acrylate, 2.9 parts of acrylic acid, and 8 parts of an aqueous solution containing sodium polyoxyethylene alkylphenyl ether sulfate in an amount of 26% by weight (emulsifier) to 24.3 parts of water and emulsifying them were added dropwise into the above reaction vessel under stirring at 60° C. over a period of 4 hours and further aging was conducted for 3 hours. After polymerization, 10% aqueous ammonia was added to adjust the pH to 8 to prepare a water-dispersion type acrylic polymer composition. A trade name "04-021", (manufactured by Arakawa Chemical Industries, Ltd.; a disproportionated rosin ester; ratio of components having a molecular weight of 300 or less: 2.76% by weight) was added as a tackifier to the water-dispersion type acrylic polymer composition in an amount of 30 parts in terms of solid matter relative to 100 parts of the acrylic polymer in the water-dispersion type acrylic polymer composition and the whole was mixed under stirring. Thereafter, a thickener (trade name "Aron B-500" manufactured by Toagosei Co., Ltd.) was added thereto in an amount of 0.5 part in terms of solid matter and the whole was mixed under stirring to obtain a water-dispersion type acrylic pressure-sensitive adhesive.

The water-dispersion type acrylic pressure-sensitive adhesive was applied on the surface of the release treatment layer of a release liner (trade name "SLB-80WD(V2)" manufactured by Kaito Chemical Industry Co., Ltd.) having a release treatment layer treated with a silicone-based release agent, followed by 2 minutes of drying at 100° C. to form a pressure-sensitive adhesive layer having a thickness of 60 μm. The pressure-sensitive adhesive layer was adhered to both sides of a nonwoven fabric-made substrate (trade name "SP base paper-14" manufactured by Daifuku Paper M.F.G. Co., Ltd.) having a basis weight of 14 g/m² to prepare a pressure-sensitive adhesive sheet (double-sided pressure-sensitive adhesive sheet).

EXAMPLE 2

A pressure-sensitive adhesive sheet (double-sided pressure-sensitive adhesive sheet) was prepared in the same manner as in Example 1 except that a trade name "Super Ester E-720" (manufactured by Arakawa Chemical Industries, Ltd.; a stabilized rosin ester; ratio of components having a molecular weight of 300 or less: 3.92% by weight) as a tackifier was used in an amount of 30 parts in terms of solid matter relative to 100 parts of the acrylic polymer in the water-dispersion type acrylic polymer composition.

EXAMPLE 3

A pressure-sensitive adhesive sheet (double-sided pressure-sensitive adhesive sheet) was prepared in the same manner as in Example 1 except that a trade name "04-039" (manufactured by Arakawa Chemical Industries, Ltd.; a polymerized rosin ester; ratio of components having a molecular weight of 300 or less: 4.06% by weight) as a tackifier was used in an amount of 30 parts in terms of solid matter relative to 100 parts of the acrylic polymer in the water-dispersion type acrylic polymer composition.

EXAMPLE 4

A pressure-sensitive adhesive sheet (double-sided pressure-sensitive adhesive sheet) was prepared in the same manner as in Example 1 except that a trade name "04-039" (manufactured by Arakawa Chemical Industries, Ltd.; a polymerized rosin ester; ratio of components having a molecular weight of 300 or less: 4.06% by weight) as a tackifier was used in an amount of 20 parts in terms of solid matter relative to 100 parts of the acrylic polymer in the water-dispersion type acrylic polymer composition.

COMPARATIVE EXAMPLE 1

A pressure-sensitive adhesive sheet (double-sided pressure-sensitive adhesive sheet) was prepared in the same manner as in Example 1 except that a trade name "04-020" (manufactured by Arakawa Chemical Industries, Ltd.; a proportionated rosin ester; ratio of components having a molecular weight of 300 or less: 4.63% by weight) as a tackifier was used in an amount of 30 parts in terms of solid matter relative to 100 parts of the acrylic polymer in the water-dispersion type acrylic polymer composition.

COMPARATIVE EXAMPLE 2

A pressure-sensitive adhesive sheet (double-sided pressure-sensitive adhesive sheet) was prepared in the same manner as in Example 1 except that a trade name "Nanolet R1050" (manufactured by Yasuhara Chemical Co., Ltd.; an aromatic modified ester; ratio of components having a molecular weight of 300 or less: 7.00% by weight) as a tackifier was used in an amount of 30 parts in terms of solid matter relative to 100 parts of the acrylic polymer in the water-dispersion type acrylic polymer composition.

COMPARATIVE EXAMPLE 3

A pressure-sensitive adhesive sheet (double-sided pressure-sensitive adhesive sheet) was prepared in the same manner as in Example 1 except that a trade name "Super Ester E-865" (manufactured by Arakawa Chemical Industries, Ltd.; a polymerized rosin ester; ratio of components having a molecular weight of 300 or less: 7.12% by weight) as a tackifier was used in an amount of 30 parts in terms of solid matter relative to 100 parts of the acrylic polymer in the water-dispersion type acrylic polymer composition.

COMPARATIVE EXAMPLE 4

A pressure-sensitive adhesive sheet (double-sided pressure-sensitive adhesive sheet) was prepared in the same manner as in Example 1 except that a trade name "Hariester-SK-508H" (manufactured by Harima Chemicals Inc.; a polymerized rosin ester; ratio of components having a molecular weight of 300 or less: 8.50% by weight) as a tackifier was used in an amount of 30 parts in terms of solid matter relative to 100 parts of the acrylic polymer in the water-dispersion type acrylic polymer composition.

COMPARATIVE EXAMPLE 5

A pressure-sensitive adhesive sheet (double-sided pressure-sensitive adhesive sheet) was prepared in the same manner as in Example 1 except that a trade name "Tamanor E-200" (manufactured by Arakawa Chemical Industries, Ltd.; a rosin phenol; ratio of components having a molecular weight of 300 or less: 8.71% by weight) as a tackifier was used in an amount of 30 parts in terms of solid matter relative to 100 parts of the acrylic polymer in the water-dispersion type acrylic polymer composition.

(With Regard to Tackifier)

With regard to the tackifiers used in Examples and Comparative Examples, the ratio of components having a molecular weight of 300 or less was determined by measuring the molecular weight (weight average molecular weight) of the tackifying resins in the tackifiers.

(Measuring Method of Molecular Weight)

The tackifier is dissolved in tetrahydrofuran (THF) to prepare a 1 g/L THF solution of the tackifier. A solution obtained by filtering the solution through a membrane filter of 0.45 μm is measured on a GPC measuring apparatus ["HLC-8120GPC" (manufactured by TOSOH Corporation); columns: TSKgel SuperHZ2000/HZ2000/HZ1000/–HZ1000/HZ1000 (60 mm I.D.×150 mm, 40° C.); a flow rate: 0.6 mL/minute; a detector: RI] to calculate a molecular weight in terms of polystyrenes.

(Evaluation)

With regard to each pressure-sensitive adhesive sheet obtained in Examples and Comparative Examples, a fogging test reflection rate (reflection rate by the fogging test in accordance with German Industrial Standard DIN 75201), a fogging test attached amount (attached amount by the fogging test in accordance with German Industrial Standard DIN 75201), an adhesive force, and a retentive force were measured or evaluated by the following methods. The results are shown in Table 1.

(Measuring Method of Fogging Test Reflection Rate)

The measurement of the fogging test reflection rate is carried out in accordance with German Industrial Standard DIN 75201-R. Specifically, each pressure-sensitive adhesive sheet is cut into a round shape having a diameter of 80 mm and placed in a state that a release liner (release paper) at only one side is peeled and in a form that an pressure-sensitive adhesive surface exposed by peeling the release liner becomes an upper side at the inner bottom of a beaker (outer diameter: 90 mm, inner diameter: 83.6 mm, height: 190 mm; it is immersed in an oil bath of 100° C. until a height of 130 mm) heated by an oil bath at 100° C., and further a glass plate always cooled to 21° C. is placed on the upper surface of the beaker (fogging measuring instrument: apparatus name "N8-FOG" manufactured by HAAKE) After standing for 3 hours in such a state, the glass plate is taken out and a reflection rate (%) of the surface at a beaker inner side of the glass plate) at the time when an incident light enters at an incident angle of 60° (sometimes referred to as "60+ incident reflection rate of glass plate after test") is determined using a trade name "REFO 60 REFLEKTOMETER" (manufactured by PRLANGE) [60° incident reflection rate (%) of glass plate after test=intensity of incident light to glass plate after test/intensity of reflection light at the time when incident light enters glass plate after test×100]. In this case, beforehand, also with regard to the surface of the glass plate before the test, a reflection rate (%) at the time when an incident light enters at an incident angle of 60° (sometimes referred to as "60° incident reflection rate of glass plate before test") has been determined using the same apparatus as above [60° incident reflection rate (%) of glass plate before test=intensity of incident light to glass plate before test/intensity of reflection light at the time when incident light enters glass plate before test×100]. Then, using the following expression (1), a fogging test reflection rate (%) is calculated.

Fogging test reflection rate (%)=[60° incident reflection rate of glass plate after test (%)/60° incident reflection rate of glass plate before test (%)]×100    (1)

(Measuring Method of Fogging Test Attached Amount)

The measurement of the fogging test attached amount is carried out in accordance with German Industrial Standard DIN 75201-W. Specifically, each pressure-sensitive adhesive sheet is cut into a round shape having a diameter of 80 mm and placed in a state that a release liner (release paper) at only one side is peeled and in a form that an pressure-sensitive adhesive surface exposed by peeling the release liner becomes an upper side at the inner bottom of a beaker (outer diameter: 90 mm, inner diameter: 83.6 mm, height: 190 mm; it is immersed in an oil bath of 100° C. until a height of 130 mm) heated by an oil bath at 100° C., and further an aluminum-made sheet (so-called aluminum foil) always cooled at 21° C. is placed on the upper surface of the beaker (fogging measuring instrument: apparatus name "N8-FOG" manufactured by HAAKE). After standing for 16 hours in such a state, the aluminum-made sheet is taken out and a weight thereof (weight of the aluminum-made sheet after test) is measured. In this case, beforehand, a weight of the aluminum-made sheet before the test (weight of the aluminum-made sheet before test) has been measured. Then, using the following expression (2), a fogging test attached amount (mg) is calculated.

Fogging test attached amount (mg)=(weight of aluminum-made sheet after test)−(weight of aluminum-made sheet before test)    (2)

(Measuring Method of Adhesive Force)

Each pressure-sensitive adhesive sheet is attached to a polyethylene terephthalate (PET)-made substrate having a thickness of 25 μm after the release liner at one side is peeled, followed by cutting the attached sheet into a size having a width of 20 mm and a length of 100 mm. Thereafter, the release liner at another side is peeled and the resulting sheet was attached under pressure by a method wherein a rubber roller having a weight of 2 kgf was once reciprocated on a stainless (SUS) plate polished with an abrasive paper having a particle size of No. 280. After standing under an environment of 23° C. or 70° C. for 30 minutes, a force required for peeling under an atmosphere of 23° C. or 70° C. (180° peeling, peeling rate 300 mm/minute) is measured using a tensile tester.

(Measuring Method of Retentive Force)

Each pressure-sensitive adhesive sheet is attached to a polyethylene terephthalate (PET)-made substrate having a thickness of 25 μm after the release liner at one side is peeled, followed by cutting the attached sheet into a size having a width of 10 mm. Thereafter, the lease liner at another side is peeled and the resulting sheet was attached to a phenol resin-made plate at a contact area of 10 mm×20 mm, the resulting plate is allowed to stand over night (12 hours), further it is allowed to stand under an atmosphere of 40° C. for 30 minutes, the phenol resin plate is hung down under an environment of 23° C., a homogeneous load of 500 g is loaded at a free end of the pressure-sensitive adhesive sheet, and a shifted distance of the pressure-sensitive adhesive sheet is measured after 1 hour of standing, the distance being regarded as a retentive force. Therefore, the smaller the value (shifted distance) is, the better the retentive force is.

TABLE 1

| | Fogging test reflection rate (%) | Fogging test attached amount (mg) | Pressure-sensitive adhesive force (N/20 mm) 23° C. | Pressure-sensitive adhesive force (N/20 mm) 70° C. | Retentive force (mm) |
|---|---|---|---|---|---|
| Example 1 | 85.4 | 0.6 | 13.3 | 10.6 | 1.4 |
| Example 2 | 74.2 | 1.3 | 12.0 | 13.4 | 1.1 |
| Example 3 | 81.8 | 0.9 | 14.3 | 19.6 | 0.7 |
| Example 4 | 90.0 | 1.0 | 14.5 | 15.8 | 0.5 |
| Comparative Example 1 | 41.1 | 1.8 | 12.8 | 9.0 | 1.2 |
| Comparative Example 2 | 32.6 | 2.7 | 7.8 | 14.4 | 0.5 |
| Comparative Example 3 | 36.2 | 3.5 | 14.3 | 15.0 | 0.3 |
| Comparative Example 4 | 38.4 | 2.8 | 13.5 | 17.6 | 0.3 |
| Comparative Example 5 | 32.2 | 5.4 | 15.8 | 19.4 | 0.9 |

From Table 1, in the pressure-sensitive adhesive sheets according to Examples 1 to 4, each of the pressure-sensitive adhesive layers is formed by an acrylic pressure-sensitive adhesive containing an acrylic polymer and a tackifying resin as well as the sheets exhibit a fogging test reflection rate of 70% or more and the fogging test attached amount of 2.0 mg or less. Therefore, the sheets have excellent pressure-sensitive adhesive force and retentive force and also the occurrence of the fogging phenomenon is reduced.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive sheet comprising at least a pressure-sensitive adhesive layer comprising an acrylic pressure-sensitive adhesive containing an acrylic polymer composition containing an acrylic polymer as a main component and a tackifier containing a rosin-based tackifying resin as a main component, wherein reflection rate and attached amount in the fogging test in accordance with German Industrial Standard DIN 75201 are 80% or more and 2.0 mg or less, respectively.

2. The pressure-sensitive adhesive sheet according to claim 1, wherein, in the acrylic pressure-sensitive adhesive which forms the pressure-sensitive adhesive layer, a ratio of components having a molecular weight of 300 or less is 4.2% by weight or less based on the total amount of solid matter of the acrylic pressure-sensitive adhesive.

3. The pressure-sensitive adhesive sheet according to claim 1, wherein, in the tackifying resin in the tackifier, a ratio of components having a molecular weight of 300 or less is 4.2% by weight or less based on the total amount of solid matter of the tackifying resin.

4. The pressure-sensitive adhesive sheet according to claim 1, wherein the acrylic polymer composition is a water-dispersion type acrylic polymer composition in which the acrylic polymer is contained in a water-dispersed state and the tackifier is a water-dispersion type tackifier in which a tackifying resin is contained in a water-dispersed state.

5. The pressure-sensitive adhesive sheet according to claim 4, wherein, in the water-dispersion type tackifier, a ratio of components having a molecular weight of 300 or less is 4.2% by weight or less based on the total amount of solid matter of the whole tackifying resin and emulsifier in the water-dispersion type tackifier.

6. The pressure-sensitive adhesive sheet according to claim 1, which is used at the time when a material for automobiles or a material for residential buildings is fixed.

* * * * *